United States Patent [19]
Chen et al.

[11] Patent Number: 6,073,656
[45] Date of Patent: *Jun. 13, 2000

[54] ENERGY ATTENUATION DEVICE FOR A CONDUIT CONVEYING LIQUID UNDER PRESSURE, SYSTEM INCORPORATING SAME, AND METHOD OF ATTENUATING ENERGY IN A CONDUIT

[75] Inventors: Yungrwei Chen, West Bloomfield; Jack R. Cooper, Dearborn, both of Mich.

[73] Assignee: Dayco Products, Inc., Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/977,081

[22] Filed: Nov. 24, 1997

[51] Int. Cl.$^7$ ..................................................... F16L 55/04
[52] U.S. Cl. ................................. 138/26; 138/42; 138/44; 181/232
[58] Field of Search ...................... 138/30, 42, 44, 138/40, 26; 181/222, 232, 238, 256, 257, 275, 281

[56] References Cited

U.S. PATENT DOCUMENTS

| | | | |
|---|---|---|---|
| 443,220 | 12/1890 | Detrick | 138/40 |
| 2,233,804 | 3/1941 | Bourne | 138/30 |
| 2,683,973 | 7/1954 | Mettler | 138/42 |
| 3,276,478 | 10/1966 | Bleasdale | 138/30 |
| 3,323,305 | 6/1967 | Klees . | |
| 3,376,625 | 4/1968 | McCulloch | 138/30 |
| 3,842,940 | 10/1974 | Bonikowski | 181/50 |
| 3,878,867 | 4/1975 | Dirks | 138/30 |
| 4,043,539 | 8/1977 | Gilmer et al. | 138/42 |
| 4,064,963 | 12/1977 | Kaan et al. | 181/256 |
| 4,116,303 | 9/1978 | Trudell | 181/256 |
| 4,285,534 | 8/1981 | Katayana et al. | 138/44 |
| 4,371,053 | 2/1983 | Jones . | |
| 4,501,341 | 2/1985 | Jones . | |
| 4,611,633 | 9/1986 | Buchholz . | |
| 4,762,150 | 8/1988 | Kokuryu | 138/44 |
| 4,784,648 | 11/1988 | Singh et al. | 138/44 |
| 4,794,955 | 1/1989 | Ejima et al. | 138/30 |
| 5,025,890 | 6/1991 | Hisashige et al. | 181/272 |
| 5,094,271 | 3/1992 | Fritz et al. | 138/30 |
| 5,168,855 | 12/1992 | Stone . | |
| 5,172,729 | 12/1992 | Vantelini . | |
| 5,201,343 | 4/1993 | Zimmermann et al. . | |
| 5,475,976 | 12/1995 | Phillips | 181/256 |
| 5,495,711 | 3/1996 | Kalkman et al. | 138/26 |
| 5,509,391 | 4/1996 | DeGroot . | |
| 5,539,164 | 7/1996 | Van Ruiten | 138/30 |
| 5,728,981 | 3/1998 | van Ruiten | 138/30 |
| 5,785,089 | 7/1998 | Kuykendal et al. | 138/42 |
| 5,941,283 | 8/1999 | Forte | 138/30 |

*Primary Examiner*—James Hook
*Attorney, Agent, or Firm*—Joseph V. Tassone

[57] ABSTRACT

An energy attenuation device for a conduit conveying liquid under pressure, a system incorporating same, and a method for attenuating energy in a conduit, are provided. The device includes a conduit that is disposed in or is part of the liquid-conveying conduit, wherein a chamber having an inlet end and an outlet end is formed in the conduit. Two separate tubes are disposed in the chamber of the conduit such that a respective annular space is provided between an inner peripheral surface of the conduit and an outer peripheral surface of each of the tubes, wherein at least one of the tubes has at least one hole in the outer peripheral surface thereof to allow communication between the interior of the tube and the chamber.

30 Claims, 5 Drawing Sheets

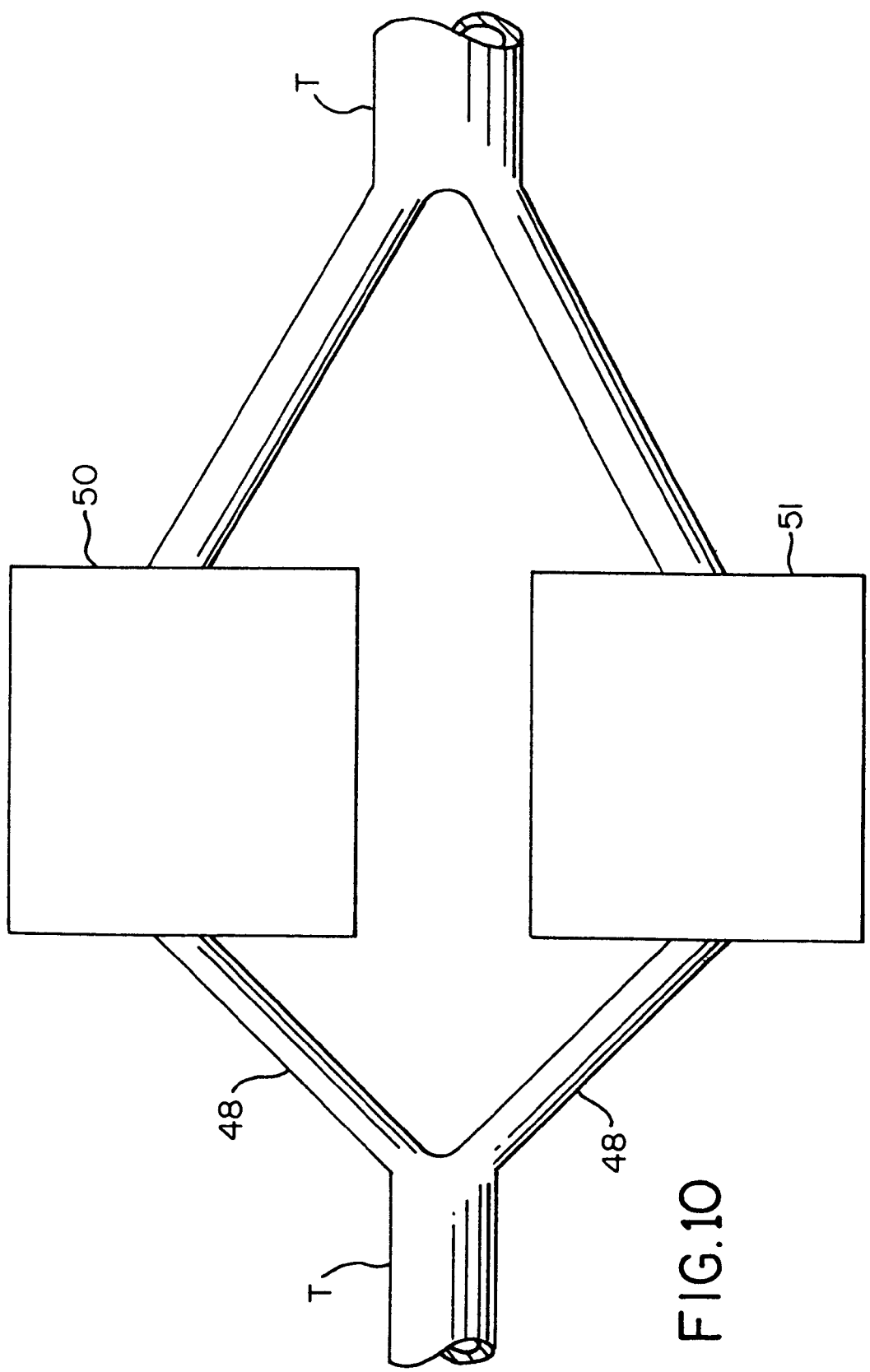

6,073,656

ENERGY ATTENUATION DEVICE FOR A CONDUIT CONVEYING LIQUID UNDER PRESSURE, SYSTEM INCORPORATING SAME, AND METHOD OF ATTENUATING ENERGY IN A CONDUIT

BACKGROUND OF THE INVENTION

1. Field of the Invention

This invention relates to a new energy attenuation device for a conduit that is adapted to convey liquid under pressure, as well as a system incorporating such a device and a method of attenuating energy in a conduit. The invention is particularly suitable for placement in a conduit conveying liquid under pressure for the attenuation of pressure pulses in the liquid, especially in the hydraulic system of the power steering unit of a vehicle. The invention would also be suitable for other hydraulic fluids.

2. Prior Art Statement

In hydraulic systems where the operating liquid is circulated by a pump, the pulsations of pressure that are generated by the pump are transmitted through the conduits and result in noise and/or vibration being produced by the hydraulic liquid. In the case of power steering fluid in vehicles, such noise and/or vibration is caused, for example, when vehicles are being parked or unparked at idle or very low speeds of movement thereof, such as by barely moving into and out of a parking space or the like while the wheels of the vehicle are being turned by the power steering mechanism thereof. In particular, substantial noise and/or vibration (shudder) can be produced in such a situation when the power steering fluid passes through the power steering mechanism from the fluid pump to the effective steering structure. Further background into this area can be obtained from U.S. Pat. No. 3,323,305, Klees, whereby this U.S. Patent is being incorporated into this disclosure by this reference thereto.

Devices are known for suppressing noise in exhaust gas mufflers. For example, U.S. Pat. No. 4,501,341, Jones, provides two side branch resonators, while U.S. Pat. No. 4,371,053, Jones, provides for an apertured tube in a gas muffler housing. Systems are also known for controlling the resonation of pressure waves in fuel injection systems. For example, U.S. Pat. No. 5,168,855, Stone, passes fluid through check valves that are provided with a flow restriction either directly therein or in a bypass line. U.S. Pat. No. 5,509,391, DeGroot, provides a spool valve assembly for controlling flow between inlet and outlet ports.

Applicants are not aware of any teaching of transferring flow of liquid under pressure from one tube to another as a means of suppressing energy, especially where at least one of the tubes is provided with at least one hole.

SUMMARY OF THE INVENTION

It is therefore an object of the present invention to provide an improved device, system and method for attenuating energy in a conduit that conveys liquid under pressure.

This object is realized pursuant to the energy attenuation device of the present invention by providing a conduit means that is disposed in or is part of the liquid-conveying conduit, wherein a chamber having an inlet end and an outlet end is formed in the conduit means, and by providing two separate tubes that are disposed in the chamber of the conduit means such that a respective annular space is provided between an inner peripheral surface of the conduit means and an outer peripheral surface of each of the tubes, wherein at least one of the tubes has at least one hole in the outer peripheral surface thereof to allow communication between the interior of the tube and the chamber.

Accordingly, it is an object of this invention to provide a novel energy attenuation device having one or more of the novel features of this invention as set forth above or hereinafter shown or described.

Another object of this invention is to provide a new system incorporating such an energy attenuation device, such a system having one or more of the novel features of this invention as set forth above or hereinafter shown or described.

Another object of this invention is to provide a new method of attenuating energy in a conduit conveying liquid under pressure, such a method having one or more of the novel features of this invention as set forth above or hereinafter shown or described.

Other objects, uses, and advantages of this invention are apparent from a reading of the specification in conjunction with the accompanying schematic drawings, which form a part thereof and wherein:

BRIEF DESCRIPTION OF THE DRAWINGS

FIG. 10 is a partial block diagram showing one arrangement for use in conjunction with the present invention.

DESCRIPTION OF PREFERRED EMBODIMENTS

Figure 1:
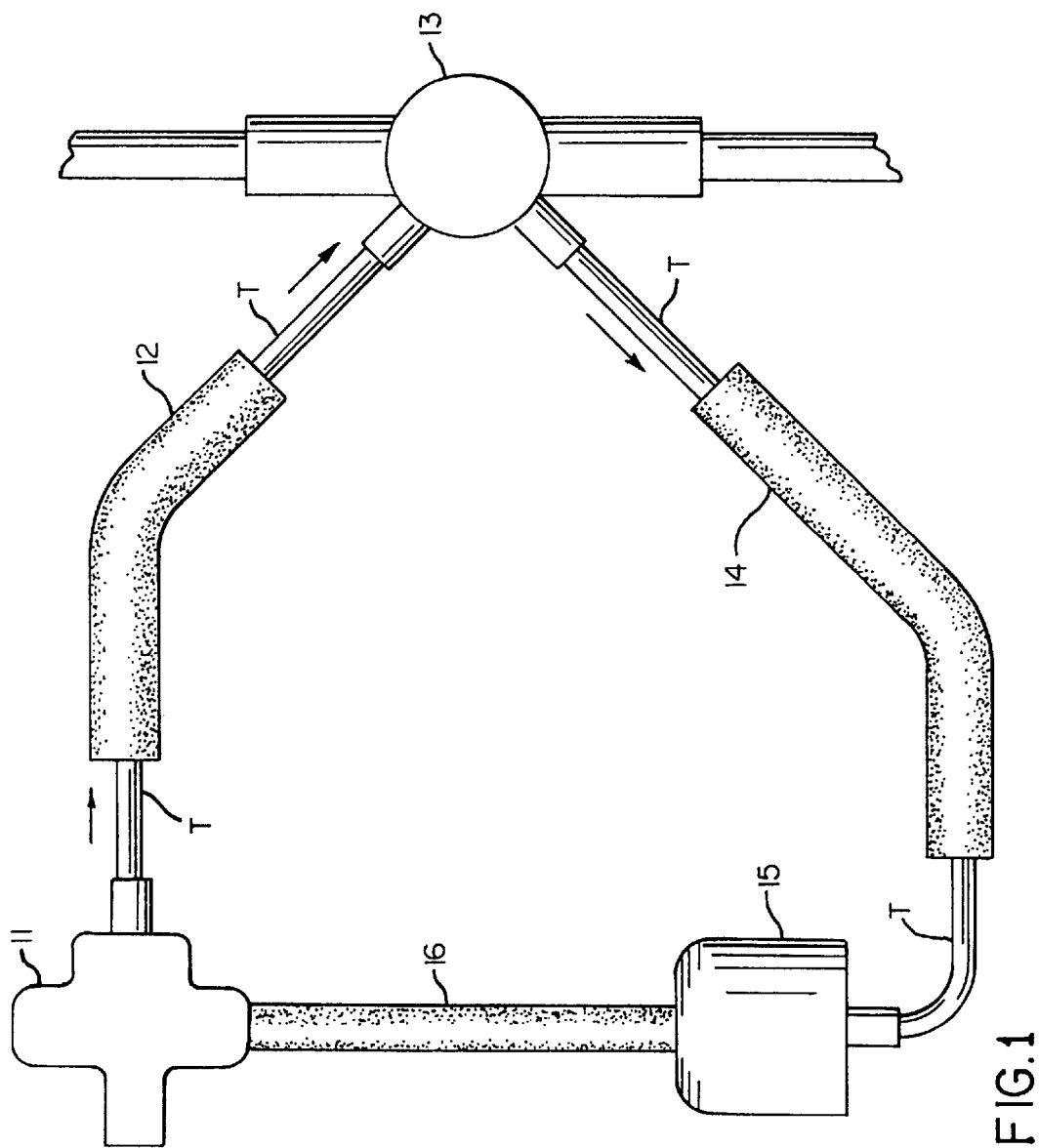
FIG. 1 illustrates a simplified automotive power steering system that incorporates one exemplary embodiment of the energy attenuation device of this invention.

While the various features of this invention are hereinafter illustrated and described as providing an energy or sound attenuation device for an automotive power steering system, it is to be understood that the various features of this invention can be utilized singly or in various combinations thereof to provide an energy attenuation device for other systems that convey liquid, especially liquid under pressure.

Therefore, this invention is not to be limited to only the embodiment illustrated in the drawings, because the drawings are merely utilized to illustrate one of the wide variety of usages of this invention.

Referring now to the drawings in detail, FIG. 1 illustrates a simplified automotive power steering system. During operation, the power steering pump 11 generates pressure ripples that are transmitted through tubing T, such as steel tubing, to the pressure hose assembly or pressure line 12, the power steering gear 13, the return hose assembly or return line 14, and the reservoir 15, and finally flow back to the pump 11 itself by means of the supply line 16. It should be noted that rather than being separated by a hose or similar conduit, the reservoir 15 and the pump 11 could actually be a single unit.

In order to greatly reduce noise, such as from resonance, for example in the pressure line 12 or in the return line 14, and thereby eliminate or at least greatly reduce the power steering noise or vibration generated by the power steering pump 11, the energy attenuation device of this invention, which is indicated generally by the reference numeral 20, is disposed either in the pressure line 12, between the steering pump 11 and the gear 13, or in the return line 14, between the gear 13 and the reservoir 15 or the pump 11. In addition, it would also be conceivable to dispose the energy attenuation device 20 in both the pressure line and the return line 14. Various exemplary embodiments of the energy attenuation device 20, and components and arrangements thereof, are illustrated in FIGS. 2–10 and will be described in detail subsequently.

The energy attenuation device 20 of this invention can, as indicated previously, be disposed in the pressure line 12 and/or the return line 14 of the system of FIG. 1. However, as illustrated in the exemplary embodiments of FIGS. 2–4, 6 and 7, the energy attenuation device 20 can also be disposed in a separate hose section that is in turn disposed in such pressure line 12 or return line 14.

Figure 2:
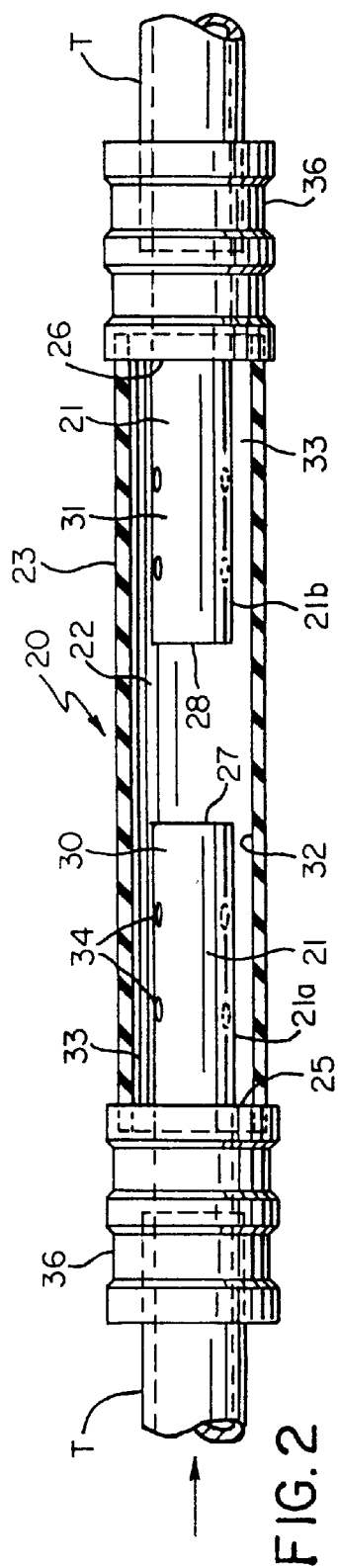
FIG. 2 is a cross-sectional view of one exemplary embodiment of the energy attenuation device of this invention.

As can be seen from the embodiment of the energy attenuation device 20 illustrated in FIG. 2, two separate apertured tubes or cables 21 are disposed in the chamber 22 formed in the hose section or means 23. In particular, an inlet tube 21a is connected to the inlet end 25 of the chamber 22, whereas an outlet tube 21b is connected to the outlet end 26 of the chamber 22. The tubes 21a, 21b are disposed in the chamber 22 in such a way that not only are the free ends 27 and 28 thereof spaced from one another, but the outer peripheral surfaces 30,31 of the inlet and outlet tubes 21a and 21b are spaced from the inner peripheral surface 32 of the hose or conduit means 23 in such a way that an annular space 33 is respectively provided about the outer peripheral surfaces 30,31 of each of the tubes 21a, 21b. By means of at least one, preferably several, holes 34 provided in each of the outer peripheral surfaces 30, 31 of the inlet and outlet tubes 21a, 21b, liquid entering the hose means 23 via the tubing T can exit the inlet tube 21a into first the annular space 33 and then part of the remainder of the chamber 22, from where it can flow through further holes 34 into the outlet tube 21b and from there out of the hose means 23 into the right-hand tubing T. Depending upon whether the free ends 27, 28 of the tubes 21a, 21b are opened or closed, all or only part of the liquid in the pressure line 12 or return line 14 will pass through the holes 34 out of the inlet tube 21a and into the outlet tube 21b. Details concerning the open or closed state of the free ends 27, 28 of the tubes 21a, 21b will be discussed subsequently.

In the embodiment of the energy attenuation device 20 illustrated in FIG. 2 the hose section 23, which is made of rubber or other elastomeric material, is disposed in the pressure line 12 or the return line 14 and is connected to the tubing T, in a fluid conveying manner, via respective couplings 36.

As indicated previously, the free ends 27, 28 of the inlet tube 21a and outlet tube 21b can be either open or closed off. Several possibilities exist for configuring the free ends 27 and 28. For example, both free ends could be open, or both could be closed. In addition, the free end 27 of the inlet tube 21a could be open while the free end 28 of the outlet tube 21b could be closed. On the other hand, the opposite arrangement could also be provided whereby the free end 27 of the inlet tube 21a would be closed and the free end 28 of the outlet tube 21b would be open.

Although the embodiment illustrated in FIG. 2 provides for a single chamber 22 with the free ends 27, 28 of the inlet and outlet tubes 21a, 21b facing each other at the middle hose mixing region of the chamber 22, it has been found according to the teachings of this invention that other configurations are also possible. For example, reference is now made to FIG. 3, wherein another configuration of the energy attenuation device of this invention is shown and is indicated generally by the reference numeral 20A, wherein parts thereof similar to the energy attenuation device 20 of FIG. 2 are indicated by like reference numerals that where appropriate are followed by the reference letter A.

Figure 3:
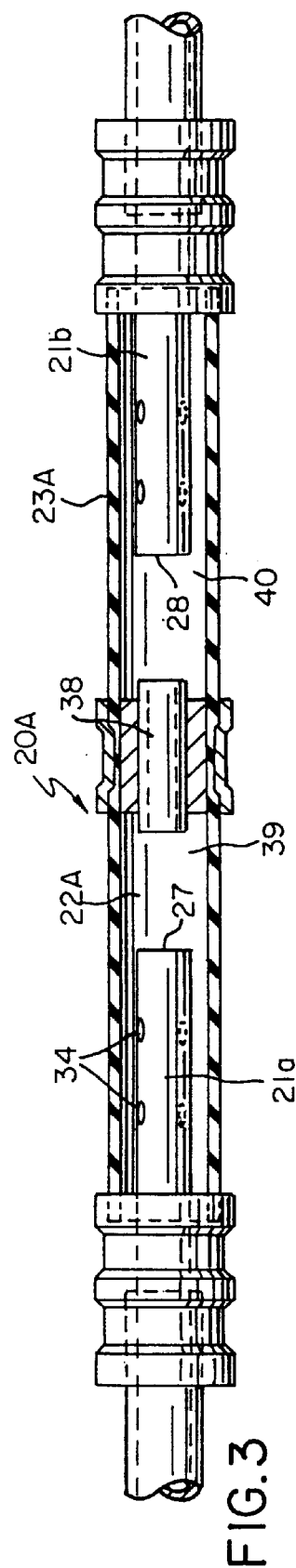
FIG. 3 is a cross-sectional view of a second exemplary embodiment of the energy attenuation device of this invention.
Figure 4:
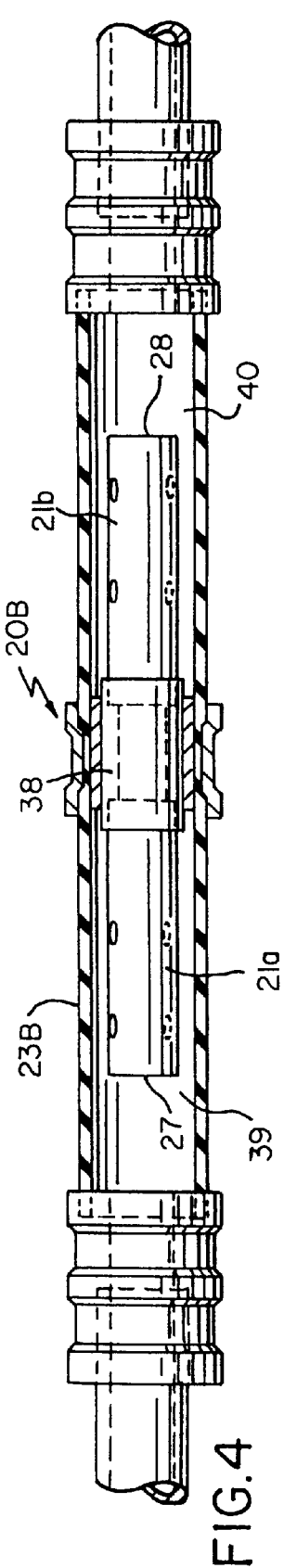
FIG. 4 is a cross-sectional view of a third exemplary embodiment of the energy attenuation device of this invention.
Figure 5:
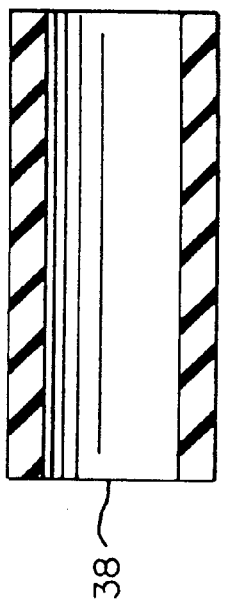
FIG. 5 is an enlarged cross-sectional view of a restrictor for use with an energy attenuation device of this invention.

The embodiment of the energy attenuation device 20A illustrated in FIG. 3 differs from that shown in FIG. 2 in that the chamber 22A is divided by a restrictor 38 into an inlet chamber portion 39 and an outlet chamber portion 40. An enlarged view of the restrictor 38 is shown in FIG. 5; the inner diameter of the restrictor is less than the inner diameter of the hose means 23A. The free end 27 of the inlet tube 21a is spaced from the restrictor 38 in the inlet chamber portion 39, while the free end 28 of the outlet tube 21b is spaced from the restrictor 38 in the outlet chamber portion 40. Thus, with the energy attenuation device 20A, liquid that is exiting the inlet tube 21, either entirely or at least partially via the holes 34, will enter the inlet chamber portion 39, will then flow through the reduced diameter portion of the restrictor 38, will enter the outlet chamber portion 40, and then at least partially via the holes 34 will enter the outlet tube 21b. As discussed in conjunction with the energy attenuation device 20 of FIG. 2, the free ends 27, 28 of the inlet and outlet tubes 21a, 21b can be either both open, both closed, or only one open and the other closed.

In the embodiment of the energy attenuation device 20A the inlet and outlet tubes 21a, 21b are connected to the inlet and outlet ends 25, 26 of the respective inlet chamber portion 39 or outlet chamber portion 40. However, it would also be possible to connect the inlet and outlet tubes 21a, 21b directly to the restrictor 38 instead of to the inlet and outlet ends of the chamber. For example, reference is now made to FIG. 4, wherein another energy attenuation device of the present invention is shown and is indicated generally by the reference numeral 20B.

In the embodiment of the energy attenuation device 20B, the free ends 27, 28 of the inlet and outlet tubes 21a, 21b face away from one another, namely toward the inlet and outlet ends of the inlet chamber portion 39 and outlet chamber portion 40 respectively, and are spaced from such inlet and outlet ends. Again, the free ends 27, 28 of the inlet and outlet tubes 21a, 21b can both be opened, can both be closed, or only one can be opened with the other being closed.

Figure 6:
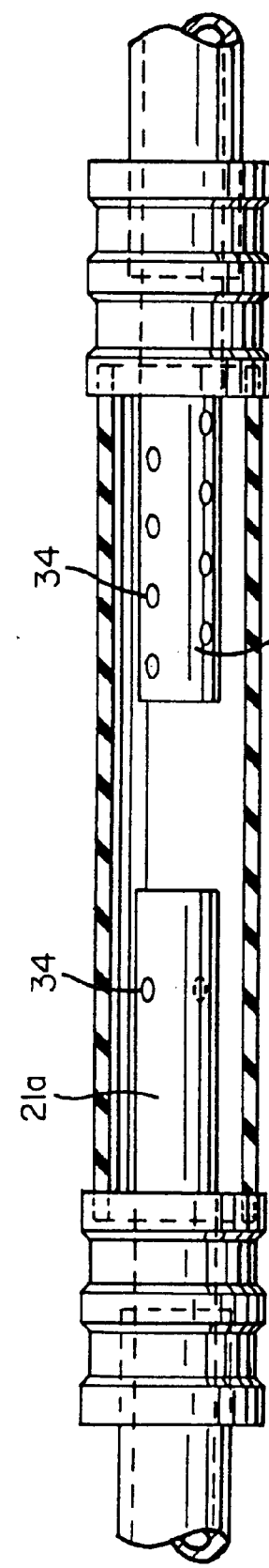
FIG. 6 is a view similar to that of FIG. 2 of a modified energy attenuation device of this invention.
Figure 7:
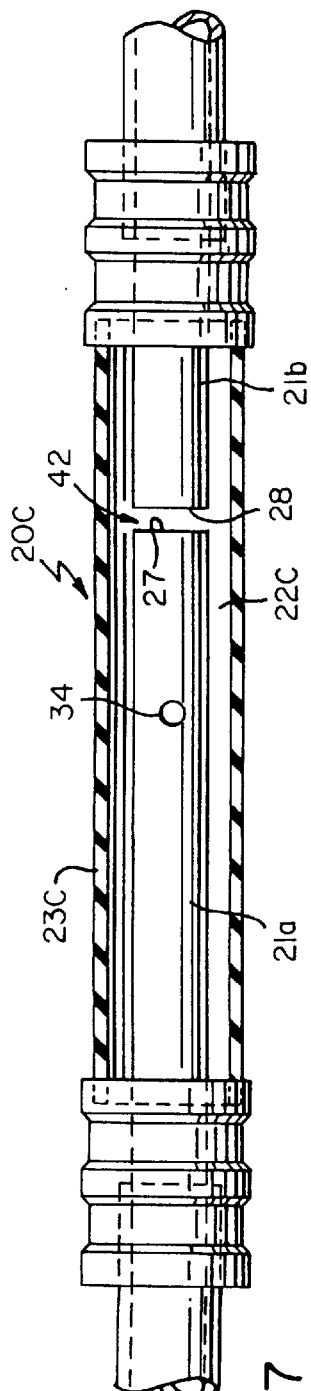
FIG. 7 is a cross-sectional view of a further exemplary embodiment of the energy attenuation device of this invention.

As indicated above, the two separate apertured tubes 21a, 21b are each provided with at least one hole 34 in the outer peripheral surface thereof. Pursuant to presently preferred embodiments, it is contemplated that each of the apertured tubes 21 will have a plurality of such holes 34. Several arrangements of these holes 34 are possible. For example, the holes 34 can be arranged in a longitudinal direction in one or more rows of such holes, either aligned or offset relative to one another, or can also be disposed in a random manner about the peripheral surfaces 30, 31 of the tubes 21a, 21b. FIG. 6 shows one such possible arrangement. In this embodiment, the apertured tube 21a on the inlet side has two holes 34 disposed 180° from one another. In contrast, the apertured tube 21b on the outlet side has two rows of four holes 34, with the rows being disposed 90° from one another, and with the holes of one row being offset in a longitudinal direction from the holes of the other row. In addition, the free end of the tube 21a is open while the free end of the tube 21b is closed. It is to be understood that although the arrangement of FIG. 6 has been illustrated in conjunction with a tube arrangement similar to that of FIG. 2, such an arrangement of the holes 34 would be possible for any of the embodiments previously described.

In addition to the number and arrangement of the holes 34 in the apertured tubes 21, it will be appreciated that other system parameters will affect the noise attenuation that can be achieved. For example, the ratios and dimensions of the components of the device relative to another can be varied. Although in the illustrated embodiments the lengths of the inlet and outlet tubes 21a, 21b are shown as being the same, the lengths of these two tubes can also differ from one another. In addition, the inlet and outlet tubes 21a, 21b can extend over varying proportions of the chamber 22. In the embodiment of the energy attenuation device 20 shown in FIG. 2, it is presently contemplated that each of the apertured tubes 21 will extend over more that one fourth of the length of the chamber 22 of the hose means 23. Similarly, in the embodiments of FIG. 3 and 4, it is contemplated that each of the apertured tubes 21a, 21b will extend over more than one half of the length of its respective inlet or outlet chamber portion 39 or 40.

Although the previously illustrated embodiments provide for an inlet tube 21a and an outlet tube 21b that are both provided with holes 34, it has been found according to the teachings of this invention that only one of the tubes 21a, 21b need be provided with such holes. In addition, rather than providing a fairly wide space in the chamber 22 of the hose means 23 between the free ends 27, 28 of the inlet and outlet tubes 21a, 21b, a narrow gap could also be provided between such free ends. For example, reference is now made to FIG. 7, wherein another energy attenuation device of the present invention is shown and is indicated generally by the reference numeral 20C.

In the embodiment of the energy attenuation device 20C, the free ends 27, 28 of the inlet and outlet tubes 21a, 21b are separated from one another by only a narrow gap 42, for example a gap having a width of approximately 1/32–1/8 of an inch. In addition, only one of the tubes, namely the inlet tube 21a, is provided with holes 34, for example two such holes that are disposed 90° from one another. The narrow gap 42 between the free ends 27, 28 of the inlet and outlet tubes 21a, 21b has in this embodiment been illustrated as being displaced toward the outlet end of the chamber 22C. However, such narrow gap could also be disposed closer to the inlet end of the chamber 22C, in which case the outlet tube 21b would be longer than the inlet tube 21a. Furthermore, although the holes 34 have been illustrated as being disposed approximately half way between the inlet and outlet ends of the chamber 22c, such holes 34 could be disposed at any desired location along one of the inlet or outlet tubes 21a, 21b. In addition, rather than being disposed on the inlet tube 21a, such holes 34 could also be disposed on the outlet tube 21b. Furthermore, any desired arrangement of the holes 34 is possible, and the embodiment of FIG. 2 could also be modified to include the narrow gap 42 of the embodiment of FIG. 7, wherein both the inlet tube 21a and the outlet tube 21b could again be provided with holes 34.

The hose means 23 can be a single section of rubber and/or other elastomeric or plastic material that is connected to metal, especially stainless steel, tubing T by means of the couplings 36, or the hose means can also comprise two separate hose sections that are interconnected by the restrictor means 38. Furthermore, the hose means 23 may be made of a single layer or of a plurality of layers of the aforementioned rubber and/or plastic. The hose means 23 may also be suitably reinforced to withstand comparatively high fluid pressures. In addition, although the tubes 21 have been illustrated as being disposed in the hose means 23, such hose or conduit means can actually be a continuation of the tubing T, or a separate tubing section, again made of metal. In contrast, the tubes 21 can be made of polymeric material, especially tetrafluoroethylene fluorocarbon resins, fluorinated ethylene-propylene resins, or polyamide; the apertured tubes could also be made of metal, especially stainless steel. Thus, the tubes 21 can be either flexible or rigid. Where the conduit means is a hose of rubber or other elastomeric material, it can, for example, have an inner diameter of 3/8 inch or 1/2 inch; where the conduit means is made of metal, it can have an inner diameter of, for example, 1/2 inch or larger. The diameter of the inlet and outlet tubes 21a, 21b will depend largely upon the diameter of the conduit means 23. For example, if the conduit means has an inner diameter of 3/8 inches, the inlet and outlet tubes could have an outer diameter of 5/16 inches or less. Similarly, if the conduit means has an inner diameter of 1/2 inches, the inlet and outlet tubes could have an outer diameter of 3/8 inches or less. The length of the conduit means, and hence of the inlet and outlet tubes, can vary depending upon need and available space. By way of example only, the conduit means could have a length of 8 inches.

The size and shape of the holes 34 can also vary. For example, circular holes 34 can have a diameter of 1/16 inches, 1/8 inches, etc. If the holes 34 have an oval shape, pursuant to one specific embodiment of the present invention the dimension of such holes can be 1/8 inches in width by 1/2 inches in length.

The restrictor means 38 has an inner diameter that is less than the inner diameter of the hose means 23. In addition, the inner diameter of the restrictor 38 can be equal to, greater than or less than the inner diameter of the inlet and outlet tubes.

Figure 8:
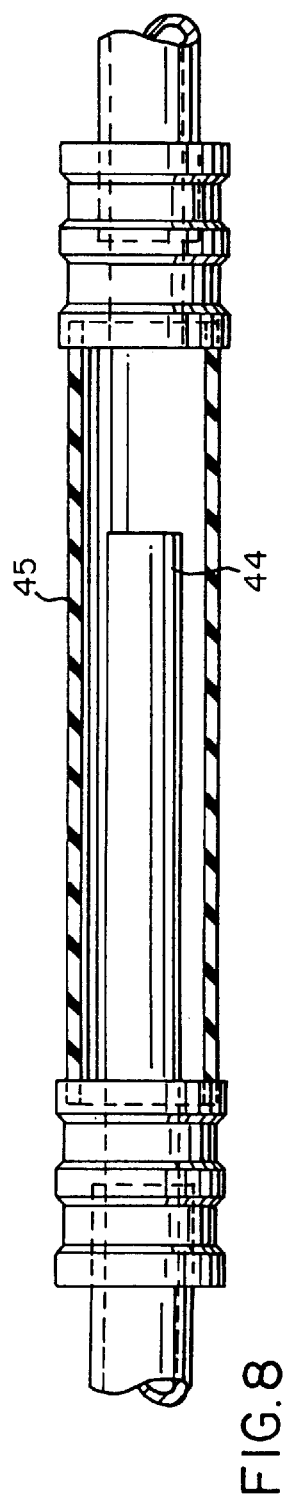
FIGS. 8 and 9 show various embodiments of tuning cable arrangements for use in conjunction with the energy attenuation apparatus of this invention.
Figure 9:
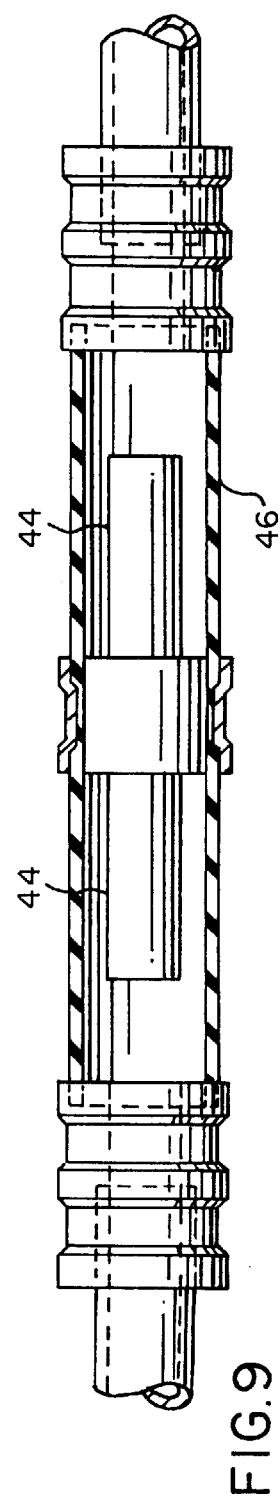

The inventive energy attenuation device can also be used in conjunction with a variety of other sound and vibration attenuation devices, which are then also disposed in the pressure line 12 and/or return line 14. For example, a 1/4 wave cable tuning assembly can be provided, for example by disposing a steel cable in a further hose section. Examples of such tuning cable arrangements in further hose sections are shown in FIGS. 8 and 9, wherein FIG. 8 shows a single tuning cable 44 disposed in the further hose section or conduit means 45, whereas FIG. 9 shows two separate tuning cables 44 disposed in a further hose section or conduit means 46. An example of a known tuning cable is disclosed in the aforementioned patent to Klees, U.S. Pat. No. 5,323,305, which patent has been incorporated into this disclosure. The tuning cable arrangements in the conduit means 45 or 46 can be disposed in series with the inventive energy attenuation device, or can be disposed in parallel therewith. Other sound and vibration attenuation devices are also known. For example, reference is made to U.S. Pat. No. 4,611,633 (Buchholz et al), U.S. Pat. No. 5,172,729 (Vantelini) and U.S. Pat. No. 5,201,343 (Zimmermann et al) whereby such US patents are also being incorporated into this disclosure by this reference thereto. Furthermore, a spring-type energy attenuation device as disclosed in applicants' copending U.S. Pat. application Ser. No. 08/853,770 could also be provided, whereby the disclosure of such application is also incorporated into this disclosure by this reference thereto. One or more of such other attenuation devices could also be used in conjunction with the energy attenuation device 20–20C of the present invention. For example, FIG. 10 shows an arrangement where the tubing T is split into branches 48, each of which leads to an energy attenuation device that is schematically indicated by one of the boxes 50 or 51. This parallel arrangement can either be disposed in series with one of the inventive energy attenuation devices 20, 20C, or one of the boxes 50, 51 can contain an inventive energy attenuation device while the other box contains a known attenuation device. Furthermore, both boxes 50 and 51 can contain the same or different ones of the inventive energy attenuation device 20–20B. It should be noted that two or more of the inventive energy attenuation devices could be disposed in series and/or in parallel with one another.

In view of the foregoing, it can be seen that this invention not only provides a new energy attenuation device, but also this invention provides a new method for attenuating energy in a fluid conveying system.

While the forms and methods of this invention is now preferred have been illustrated and described as required by the Patent Statute, it is to be understood that other forms and method steps can be utilized and still fall within the scope of the appended claims, whereby it is believed that each claim sets forth a novel, useful and unobvious invention within the purview of the Patent Statute.

What is claimed is:

1. An energy attenuation device for a conduit adapted to convey a liquid under pressure, comprising:
    a conduit means that is disposed in or is part of said liquid-conveying conduit, wherein a chamber having an inlet end and an outlet end is formed in said conduit means;
    two separate tubes disposed in said chamber of said conduit means such that a respective annular space is provided between an inner peripheral surface of said conduit means and an outer peripheral surface of each of said tubes, wherein at least one of said tubes has at least one hole in said outer peripheral surface thereof to allow communication between an interior of said tube and said chamber, and wherein each of said tubes has a free end; and
    a restrictor means disposed in said chamber of said conduit means to divide said chamber into an inlet chamber portion and an outlet chamber portion, wherein said inlet and said outlet chamber portions are in direct fluid communication with one another via said restrictor means, wherein one of said tubes is disposed in said inlet chamber portion and is connected to said inlet end of said chamber, and the other of said tubes is disposed in said outlet chamber portion and is connected to said outlet end of said chamber, and wherein said free ends of said tubes are each spaced by an open gap from said restrictor means.

2. An energy attenuation device according to claim 1, wherein each of said tubes extends over more than one half of the length of its respective chamber portion.

3. An energy attenuation device according to claim 1, wherein said restrictor means has an inner diameter that is less than an inner diameter of said conduit means and wherein said inner diameter of said restrictor means is equal to, greater than, or less than an inner diameter of said tubes.

4. An energy attenuation device according to claim 1, wherein said conduit means comprises two separate hose sections that are interconnected by said restrictor means.

5. An energy attenuation device according to claim 1, wherein said conduit means is connected to said liquid-conveying conduit via couplings.

6. An energy attenuation device according to claim 1, wherein said tubes are made of polymeric material or metal, and said conduit means is made of elastomeric material or metal.

7. An energy attenuation device according to claim 1, wherein said conduit means is a separate hose section disposed in said liquid-conveying conduit.

8. An energy attenuation device according to claim 1, wherein each of said tubes is provided with a plurality of said holes.

9. A system incorporating said energy separate attenuation device of claim 1 and further including at least one further energy attenuation device of any desired type disposed in series with or parallel to said first mentioned energy attenuation device.

10. An energy attenuation device according to claim 1, wherein both free ends of said tubes are open and communicate with said chamber of said conduit means, both free ends are closed off, or one of said free ends is open while the other is closed off.

11. An energy attenuation device for a conduit adapted to convey a liquid under pressure, comprising:
    a conduit means that is disposed in or is part of said liquid-conveying conduit, wherein a chamber having an inlet end and an outlet end is formed in said conduit means, and wherein said chamber contains no restrictor means;
    two separate tubes disposed in said chamber of said conduit means such that a respective annular space is provided between an inner peripheral surface of said conduit means and an outer peripheral surface of each of said tubes, wherein at least one of said tubes has at least one hole in said outer peripheral surface thereof to allow communication between an interior of said tube and said chamber, wherein each of said tubes has a free end, wherein one of said tubes is connected to said inlet end of said chamber of said conduit means, and the other of said tubes is connected to said outlet end of said chamber, and wherein said free ends of said tubes face and are spaced from one another by an open gap.

12. An energy attenuation device according to claim 11, wherein both free ends of said tubes are open and communicate with said chamber of said conduit means, both free ends are closed off, or one of said free ends is open while the other is closed off.

13. An energy attenuation device according to claim 11, wherein said free ends of said tubes are spaced from one another by a narrow gap of approximately $\frac{1}{32}$ to $\frac{1}{8}$ of an inch.

14. An energy attenuation device according to claim 11, wherein each of said tubes extends over more than one fourth of the length of said chamber of said conduit means, and wherein said tubes are of the same length or differ in length relative to one another.

15. An energy attenuation device according to claim 11, wherein said tubes are made of polymeric material or metal, and said conduit means is made of elastomeric material or metal.

16. An energy attenuation device according to claim 11, wherein said conduit means is a separate hose section disposed in said liquid-conveying conduit.

17. An energy attenuation device according to claim 11, wherein each of said tubes is provided with a plurality of said holes.

18. A system incorporating said energy attenuation device of claim 11 and further including at least one further separate energy attenuation device of any desired type disposed in series with or parallel to said first mentioned energy attenuation device.

19. An energy attenuation device for a conduit adapted to convey a liquid under pressure, comprising:
   a conduit means that is disposed in or is part of said liquid-conveying conduit, wherein a chamber having an inlet end and an outlet end is formed in said conduit means;
   two separate tubes disposed in said chamber of said conduit means such that a respective annular space is provided between an inner peripheral surface of said conduit means and an outer peripheral surface of each of said tubes, wherein at least one of said tubes has at least one hole in said outer peripheral surface thereof to allow communication between an interior of said tube and said chamber, and wherein each of said tubes has a free end; and
   a restrictor means disposed in said chamber of said conduit means to divide said chamber into an inlet chamber portion and an outlet chamber portion, wherein one of said tubes is connected to said restrictor means such that it is disposed in said inlet chamber portion with the free end of said tube being spaced by an open gap from said inlet end of said chamber, wherein the other of said tubes is connected to said restrictor means such that it is disposed in said outlet chamber portion with the free end of said tube being spaced by an open gap from said outlet end of said chamber, and wherein said tubes are in direct fluid communication with one another via said restrictor means.

20. An energy attenuation device according to claim 19, wherein both free ends of said tubes are open and communicate with said chamber of said conduit means, both free ends are closed off, or one of said free ends is open while the other is closed off.

21. An energy attenuation device according to claim 19, wherein each of said tubes extends over more than one half of the length of its respective chamber portion, and wherein said tubes are of the same length or differ in length relative to one another.

22. An energy attenuation device according 19, wherein said restrictor means has an inner diameter that is less than an inner diameter of said conduit means, and wherein said inner diameter of said restrictor means is equal to, greater than, or less than an inner diameter of said tubes.

23. An energy attenuation device according to claim wherein said conduit means comprises two separate hose sections that are interconnected by said restrictor means.

24. An energy attenuation device according to claim 19, wherein said tubes are made of polymeric material or metal, and said conduit means is made of elastomeric material or metal.

25. An energy attenuation device according to claim 19, wherein said conduit means is a separate hose section disposed in said liquid-conveying conduit.

26. An energy attenuation device according to claim 19, wherein each of said tubes is provided with a plurality of said holes.

27. A system incorporating said energy attenuation device of claim 10, and further including at least one further separate energy attenuation device of any desired type disposed in series with or parallel to said first mentioned energy attenuation device.

28. A method of attenuating energy in a conduit adapted to convey a liquid under pressure, including the steps of:
   disposing a conduit means in or as part of said liquid-conveying conduit, wherein a chamber having an inlet end and an outlet end is formed in said conduit means;
   disposing two separate tubes in said chamber of said conduit means such that a respective annular space is provided between an inner peripheral surface of said conduit means and an outer peripheral surface of each of said tubes, wherein at least one of said tubes has at least one hole in said outer peripheral surface thereof to allow communication between an interior of said tube and said chamber, and wherein each of said tubes has a free end; and
   disposing a restrictor means in said chamber of said conduit means to divide said chamber into an inlet chamber portion and an outlet chamber portion, wherein one of said tubes is connected to said restrictor means such that it is disposed in said inlet chamber portion with the free end of said tube being spaced by an open gap from said inlet end of said chamber, wherein the other of said tubes is connected to said restrictor means such that it is disposed in said outlet chamber portion with the free end of said tube being spaced by an open gap from said outlet end of said chamber, and wherein said tubes are in direct fluid communication with one another via said restrictor means.

29. A method of attenuating energy in a conduit adapted to convey a liquid under pressure, including the steps of;
   disposing a conduit means in or as part of said liquid-conveying conduit, wherein a chamber having an inlet end and an outlet end is formed in said conduit means;
   disposing two separate tubes in said chamber of said conduit means such that a respective annular space is provided between an inner peripheral surface of said conduit means and an outer peripheral surface of said tubes, wherein at least one of said tubes has at least one hole in said outer peripheral surface thereof to allow communication between an interior of said tube and said chamber, and wherein each of said tubes has a free end; and
   disposing a restrictor means in said chamber of said conduit means to divide said chamber into an inlet chamber portion and an outlet chamber portion, wherein said inlet and said outlet chamber portions are in direct fluid communication with one another via said restrictor means, wherein one of said tubes is disposed in said inlet chamber portion and is connected to said inlet end of said chamber, and the other of said tubes is disposed in said outlet chamber portion and is connected to said outlet end of said chamber, and wherein said free ends of said tubes are each spaced by an open gap from said restrictor means.

30. A method of attenuating energy in a conduit adapted to convey a liquid under pressure, including the steps:
   disposing a conduit means in or as part of said liquid-conveying conduit, wherein a chamber having an inlet end and an outlet end is formed in said conduit means, and wherein said chamber contains no restrictor means; and disposing two separate tubes in said chamber of said conduit means such that a respective annular space is provided between an inner peripheral surface of said conduit means and an outer peripheral surface of each of said tubes, wherein at least one of said tubes has at least one hole in said outer peripheral surface thereof to allow communication between an interior of said tube and said chamber, wherein each of said tubes has a free end, wherein one of said tubes is connected to said inlet end of said chamber of said conduit means, and the other of said tubes is connected to said outlet end of said chamber, and wherein said free ends of said tubes face and are spaced from one another by an open gap.

* * * * *